Patented Jan. 12, 1937

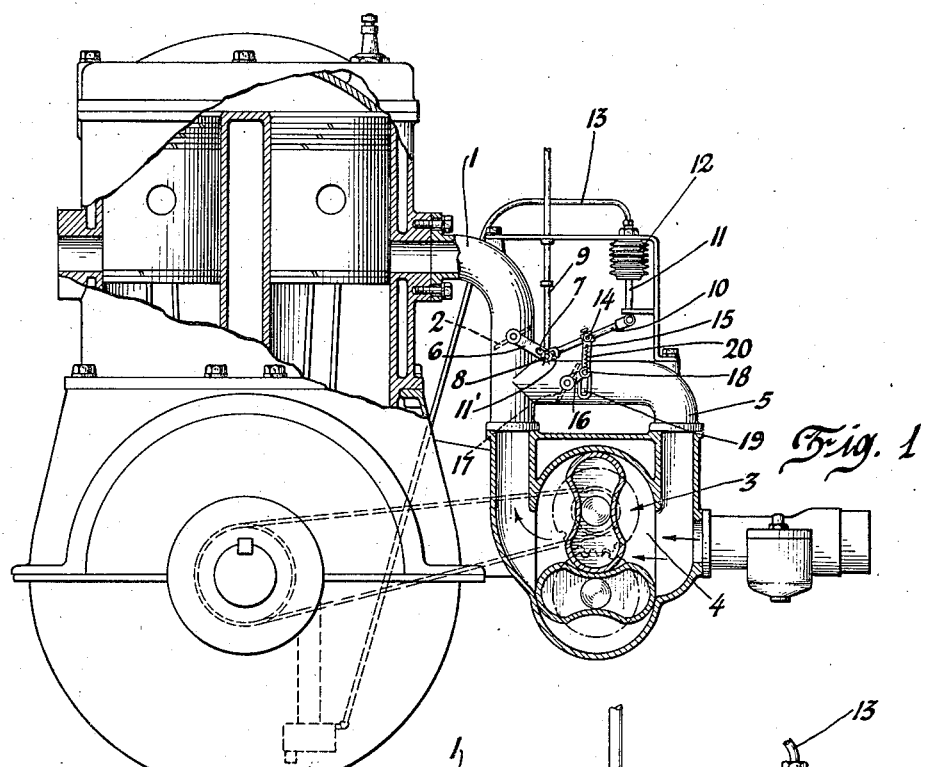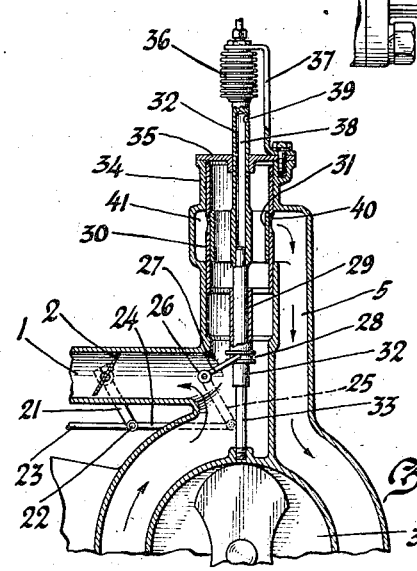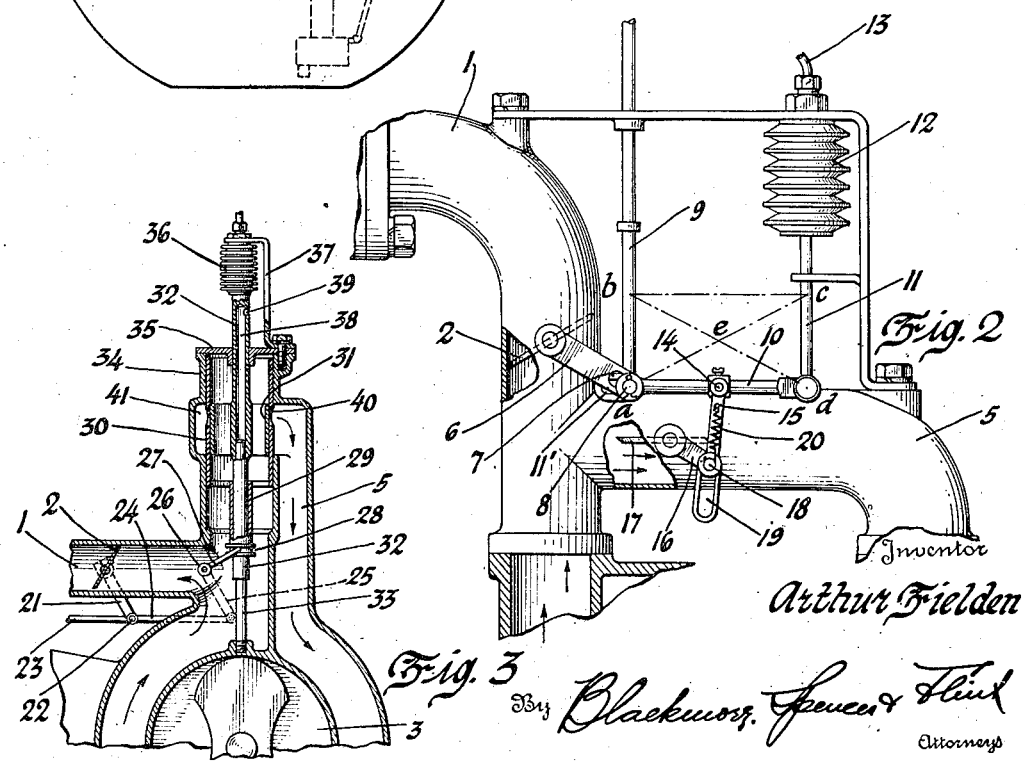

2,067,757

UNITED STATES PATENT OFFICE 2,067,757

ENGINE BLOWER CONTROL

Arthur Fielden, Detroit, Mich., assignor to General Motors Corporation, Detroit, Mich., a corporation of Delaware Application September 15, 1933, Serial No. 689,517

12 Claims. (Cl. 123—119)

This invention relates to a means of controlling the amount of air or combustible mixture at superatmospheric pressure supplied to an internal combustion engine from a compressor, a blower, or a supercharger, in accordance with the actual requirements of the engine.

It relates particularly to an internal combustion engine with a positive displacement type of blower the actual output of which is directly proportional to its speed, whereas the actual requirements of the engine depend on the speed of the engine and the actual load or torque requirements at that speed.

The invention is particularly applicable to an internal combustion engine with combustion at constant volume working under a wide range of speed and load conditions, charged with air or combustible mixture at superatmospheric pressure from a blower driven by the engine.

It is applicable to supercharged four stroke cycle engines as well as to two stroke cycle engines.

If the blower is arranged to provide sufficient charge for maximum torque at any speed, it will provide an excess of charge for a lesser torque at all speeds, and it becomes necessary to provide some other path of flow for the excess amount, other than to the engine, or else to throttle the blower intake. If the blower is of the positive displacement type, then, since the power required to drive a positive displacement blower depends on the difference between inlet and outlet pressures, the power or pumping losses at high speed low load will be considerable if the blower intake is throttled. It is therefore better to provide some other path of flow for the excess amount of charge, other than to the engine. If the blower is to deliver air, the excess amount might be blown to waste through a relief valve, but if only for reasons of economy this would not be practicable if the blower is to deliver mixture. In any case, and whether the blower supplies air or mixture to the engine, a saving in the power required to drive the blower can be effected by by-passing the excess amount back to the suction side of the blower thereby making the power required to drive the blower proportional to the actual power developed by the engine.

One object of the invention is an internal combustion engine and blower combination in which the master controlling means for the engine—which may be the ordinary manually controllable throttle—coacts with an engine speed and/or torque responsive device in order automatically to effect a positioning of a control means for the blower which will be a differential of the relative positions of the master controlling means and the speed and/or torque responsive device whereby the effective output of the blower will be varied in accordance with the power requirements of the engine.

It is a specific object of the invention to provide an engine having a positive displacement blower driven at a fixed speed ratio relative to the engine with a valve controlling an additional or alternative path of flow other than to the engine whose position is a differential function of the throttle position and the speed of the engine such that as the throttle is opened the valve tends to be closed, while as the speed rises the valve tends to be opened.

It is a still further object of the invention to achieve the above action of the valve in such a way that the valve is closed at full throttle opening whatever the speed, is fully open at closed throttle maximum speed, and closed at closed throttle minimum speed. The valve will be almost closed at closed throttle, idling speed, and entirely closed at less than idling speed.

The foregoing and other objects of the invention will be apparent as the description proceeds.

The drawing shows the application of the invention to a U-type two-cycle engine.

In the drawing

Figure 1 is a part sectional elevation of a U-type two-cycle engine with a Roots type blower driven at a fixed speed ratio therefrom and control mechanism in accordance with the invention, and showing the position of the parts of the control mechanism when the engine is idling at its lowest speed, or stopped.

Figure 2 is an enlarged view of the control means of Figure 1 showing the position of the parts with the throttle closed and the engine overrunning at its highest speed.

Figure 3 shows an alternative form of the invention in which two interacting balanced sleeve valves replace the balanced butterfly bypass valve of Figures 1 and 2.

In the drawing, 1 is the conduit between the engine and the blower provided with a master control which is the usual balanced butterfly throttle valve 2 through which charge is supplied to the engine from the blower 3 having an inlet 4 for air or combustible mixture. From the blower 3 between the blower and the throttle valve 2 an additional passageway or branch conduit 5, controlled by a bypass valve, serves as an additional outlet from the blower other than to the engine. In the embodiments of the invention illustrated, it leads any excess charge back to the inlet side of the blower.

Referring now to Figures 1 and 2, the throttle valve 2 has an arm 6 with a slotted hole 7 therein.

Linked to the arm 6 by a link pin 8 slidable in the slotted hole 7 is a throttle control rod 9. The rod 9 is moved axially by manual or any other suitable means to hold the throttle valve 2 in any position betwen closed and fully open positions.

Pivoted also on the link pin 8 is a rod 10 having a slotted hole 11' for the link pin 8. The other end of the rod 10 is pivoted to the rod 11 which moves axially under the influence of any suitable speed responsive device which, in the example illustrated, is a sylphon 12 actuated by the engine oil pressure.

The engine oil under pressure is delivered to the sylphon 12 through the pipe 13.

For any given throttle position the speed, and hence the oil pressure is a function of the load.

Mounted on the rod 10 is a pivot 14 for a link 15 to the arm 16 of a balanced butterfly bypass valve 17. The arm 16 has a pivot pin 18 engaging a slotted hole 19 in the link 15.

A spring 20 tends continually to hold the arm 16 towards that end of the slotted hole 19 nearer to the pivot axis of the link 15. The linkage connections constitute a lost motion device permitting movement of the connections beyond the closed position of the bypass valve.

The rod 9 directly controls the position of the engine throttle valve 2 while the bypass valve 17 has its position controlled by the differential movement of the rods 9 and 11.

The various positions of the linkages are shown diagrammatically in Figure 2, where the rod 9 moves from $a$ to $b$ in moving the throttle valve 2 from closed to fully open position, and the rod 11 moves from $c$ to $d$ as the speed rises from zero or idling speed to maximum speed.

The pivotal point of link 15 is adjustable along the rod 10 so as to secure any desired differential ratio of influence of movement of throttle and speed responsive device on the bypass valve. As illustrated, distances $a\ b$ and $c\ d$ are equal, and link 15 is pivoted to the middle of rod 10.

The line $a\ c$ represents the position of the rod 10 when the throttle is "closed" and the engine idling or stopped. In this position the bypass valve is closed. If, now, as the throttle is opened the engine speed does not increase commensurately with the throttle opening, slot 19 in the link 15 permits of the movement of the pivot 14 on rod 10 with the link 15 beyond the closed position of the bypass valve by virtue of the lost motion connection so provided.

The bypass butterfly valve is balanced so as to be uninfluenced by the pressure in the bypass return pipe but as previously pointed out the spring 20 tends continually to hold the arm 16 towards that end of the slotted hole 19 nearer to the pivot axis of the link 15.

The line $b\ d$ represents the position of the rod 10 when the throttle is fully open and the engine running at its maximum speed, while the line $b\ c$ represents the position of the rod 10 when the throttle is fully open and the engine stationary or at idling speed.

It will be noted that the bypass valve is fully closed whenever the rod 10 does not lie outside the area defined by lines passing successively through the points $a, b, c, d, e, a$. Expressed otherwise, this means that the bypass valve remains closed whenever the speed is less than commensurate with the throttle position but is open proportionately to the speed when this is higher than commensurate with the throttle position.

Referring now to the alternative structure shown in Figure 3, the balanced butterfly throttle valve 2 is provided with an arm 21 having a link pin connection 22 with the throttle control rod 23.

Also linked to the pin 22 is a rod 24 which is linked to the arm 25 of a bell crank lever suitably pivoted at 26 and having an arm 27 engaging a groove 28 in the boss 29 of a sleeve valve member 30 interacting with a second sleeve valve member 31.

The sleeve valve member 31 is provided with a stem 32 projecting from both ends and bored to slide on a guide rod 33 supported on the blower housing in the outlet therefrom and situated axially of a cylindrical extension 34 of the blower outlet and engine inlet pipe 1. The extension 34 is sealed by a cover 35 through which the stem 32 is a sliding fit.

The valve member 30 is a working fit in the bore of the extension 34 and has its boss 29 bored to slide on the stem 32 of the valve member 31 which is a working fit in the bore of the valve member 30.

The valve members have equal areas at either end so as to be "balanced" and uninfluenced by the fluid pressure.

The upper end of the stem 32 of valve member 31 is attached to a speed responsive device which in the example illustrated is a sylphon 36 supported on a bracket 37 and actuated by the engine oil pressure.

The bore 38 of the stem 32 is provided with a pressure relief hole 39.

Ports 40 are provided in the valve member 30 opening into a chamber 41 connected with the bypass return pipe 5.

Any desired differential ratio of influence of movement of throttle and speed responsive device on the opening of the ports 40 can be obtained by varying the linkages therebetween.

As the throttle is opened by a movement of rod 23, the arm 27 of the bell crank lever draws the ported valve member 30 downwards. If the speed of the engine is less than commensurate with the throttle position, the ports 40 remain closed by the sleeve valve member 31 but if the speed of the engine is more than commensurate with the throttle position, the valve member 31 is in a position where its upper or controlling edge has opened the ports 40 thus opening a path of flow from the blower outlet side to the bypass return pipe. In both arrangements the bypass remains closed at full throttle opening whatever the speed; it is fully open at closed throttle maximum speed, and closed at closed throttle minimum speed. The effect is as if the throttle position were a measure of the speed, the torque being constant, with automatic means for maintaining the speed set by the throttle within the torque variation limitations of the engine.

The degree of opening of the bypass valve is a differential of the throttle position and the speed of the engine and the opening of the additional outlet is thus differentiated in accordance with the position of the throttle valve and the speed of the engine thereby varying the blower pressure according to the power requirements.

When the additional outlet is a return pipe to the inlet side of the blower, the actual net output of the blower, and hence the work done in driving the blower, varies accordingly as the power requirement.

For any given throttle position the speed of the engine varies inversely as the torque, and the speed responsive device is therefore also a torque responsive device.

It will be obvious that the invention is not limited to engines in which the charge of air or mixture is forced into the cylinder under pressure, but is applicable equally to engines in which the exhaust gases are drawn out of the cylinder and a new charge drawn into the cylinder by an exhaust blower connected to the exhaust side of the engine. In such a case the engine throttle valve would be placed in the discharge outlet from the blower to atmosphere.

I claim:

1. In combination, an internal combustion engine, a source of fuel supply, a blower, a master control means for the engine, a device responsive to the speed developed by the engine, and means whose position is differentiated in accordance with the position of the master control and said device, automatically controlling the supply of fuel and the effective output of the blower in accordance with the power requirements of the engine.

2. In combination, an internal combustion engine, a source of fuel supply, a blower, a master control means for the engine, a device responsive to changes in the torque developed by the engine in any given position of the master control means, and means whose position is differentiated in accordance with the position of the master control and said device, automatically controlling the supply of fuel and the effective output of the blower in accordance with the power requirements of the engine.

3. In combination, an internal combustion engine, a master control means for the engine, a fuel supply means, a blower for said engine, an engine speed responsive device, a control mechanism for said blower and the fuel supply means, and adjustable interacting means between said master control means, said device, and said blower and fuel supply control mechanism, whereby the position of said blower and fuel supply control mechanism is a differential of the relative positions of said master control and said device.

4. In combination, an internal combustion engine, a master control means for the engine, a fuel supply means, a blower for said engine, a device responsive to changes in torque, developed by the engine in any given position of the master control means, a control mechanism for said blower and the fuel supply means, and adjustable interacting means between said master control means, said device, and said blower and fuel supply control mechanism, whereby the position of said blower and fuel supply control mechanism is a differential of the relative positions of said master control and said device.

5. In combination, an internal combustion engine, a blower, a conduit constituting a circulating passage from the discharge side to the inlet side of the blower, a bypass valve in the conduit, a branch conduit to the engine from one side of the bypass valve, a branch conduit to atmosphere from the other side of the bypass valve, a manually controlled throttle valve in the branch conduit connected to the discharge side of the blower, a device responsive to the speed of the engine, and connections between the throttle valve, the speed responsive device and the bypass valve whereby the degree of opening of the latter is a differential of the throttle position and the speed of the engine.

6. In combination, an internal combustion engine, a blower, a conduit between the engine and the discharge side of the blower, a throttle valve in the conduit, a branch conduit on the discharge side of the blower between the throttle valve and the blower, a bypass valve in the branch conduit, a device responsive to the speed of the engine, and connections from the throttle valve and the speed responsive device to the bypass valve, whereby the degree of opening of the latter is a differential of the throttle position and the speed of the engine.

7. The combination according to claim 6 in which the branch conduit completes a circuit for the circulation of the working fluid from one side to the other of the blower.

8. The combination according to claim 6 in which the throttle valve and the bypass valve are butterfly valves.

9. The combination according to claim 6 in which the connections between the throttle valve, the speed responsive device, and the bypass valve are such that the bypass valve is closed at full throttle opening whatever the speed, is fully open at closed throttle maximum speed, and closed at closed throttle minimum speed.

10. The combination according to claim 6 in which the bypass valve is constituted by two interacting balanced sleeve valve members, the movements of which are controlled respectively by the throttle valve and the speed responsive device.

11. The combination according to claim 6 in which the bypass valve is incapable of movement beyond its closed position and the connections between the throttle valve, the speed responsive device and the bypass valve include a lost motion device permitting of movement of the connections beyond the closed position of the bypass valve.

12. The combination according to claim 6 in which the device responsive to the speed of the engine consists of a sylphon actuated by fluid pressure from a fluid pump driven by the engine.

ARTHUR FIELDEN.